United States Patent [19]

Herrod

[11] Patent Number: 6,005,574
[45] Date of Patent: Dec. 21, 1999

[54] DATA PROCESSING SYSTEM INCLUDING METHOD AND APPARATUS FOR PERFORMING GRAPHICS CLIPPING OPERATIONS

[75] Inventor: John Andrew Herrod, Eastleigh, United Kingdom

[73] Assignee: International Business Machines Corporation, Armonk, N.Y.

[21] Appl. No.: 08/386,604

[22] Filed: Feb. 9, 1995

Related U.S. Application Data

[63] Continuation of application No. 07/901,459, Jun. 19, 1992, abandoned.

[30]  Foreign Application Priority Data

Jul. 5, 1991 [GB]  United Kingdom ............... 91306144

[51] Int. Cl.$^6$ .................................................. G06F 3/14
[52] U.S. Cl. ........................ 345/344; 345/434; 345/113; 345/118
[58] Field of Search ................................. 395/157, 158, 395/134, 143; 345/113, 114, 118, 119, 120, 340, 342, 343, 344, 345, 434, 443

[56]  References Cited

U.S. PATENT DOCUMENTS

| | | | |
|---|---|---|---|
| 4,698,779 | 10/1987 | Holden et al. ....................... | 345/118 X |
| 4,769,636 | 9/1988 | Iwami et al. ............................. | 345/340 |
| 4,779,081 | 10/1988 | Nakayama et al. ..................... | 345/340 |
| 4,806,919 | 2/1989 | Nakayama et al. ..................... | 345/340 |
| 4,890,257 | 12/1989 | Anthias et al. ......................... | 345/344 |
| 5,031,114 | 7/1991 | Yamagami ............................. | 345/434 |
| 5,040,130 | 8/1991 | Chang et al. ........................... | 345/434 |
| 5,079,545 | 1/1992 | Priem et al. ............................ | 345/118 |
| 5,216,413 | 6/1993 | Seiler et al. ............................ | 345/340 |

FOREIGN PATENT DOCUMENTS

| | | |
|---|---|---|
| 0163852 | 12/1985 | European Pat. Off. . |
| 0255544 | 10/1988 | European Pat. Off. . |
| 2219470 | 6/1989 | United Kingdom . |

*Primary Examiner*—Crescelle N. dela Torre
*Attorney, Agent, or Firm*—William A. Kinnaman, Jr.; Mark S. Walker

[57]  ABSTRACT

A list of graphics orders defining the graphics objects to be displayed is processed to generate a list of modified graphics orders representing those portions of the graphics objects not overlaid by an overlapping area. The mechanisms for clipping to the inside of a bounded area are adapted to determine what portion of an area of graphics lies outside a bounded area. The invention includes techniques for dealing with graphics in the form of lines, areas bounded by lines, and images including arrays of picture elements or symbol set characters.

9 Claims, 9 Drawing Sheets

PRIOR ART

DATA PROCESSING SYSTEM INCLUDING METHOD AND APPARATUS FOR PERFORMING GRAPHICS CLIPPING OPERATIONS

This is a continuation of application Ser. No. 07/901,459 filed on Jun. 19, 1992, now abandoned.

BACKGROUND OF THE INVENTION

1. Field of the Invention

This invention relates to the field of graphics display with data processing systems. More particularly, this invention relates to graphics clipping.

2. Description of the Related Art

It is known to provide graphics displays comprising a number of overlapping areas, such as the rectangular windows in the Operating System/2 (trademark) or Graphical Data Display Manager programs produced by International Business Machines Corporation. Each window contains graphics objects and as the user varies the size of the window the system determines what portion of the objects are inside the window and displays only that portion. This process is known as clipping. The commonly assigned application of applicant J. A. Herrod, Ser. No. EP 91306143.8, filed in the European Patent Office on Jul. 5, 1991, concurrently herewith and entitled "Graphics Processing Method and Apparatus" (Attorney Docket No. UK9-90-008), describes a number of clipping techniques.

In such displays each window can be thought to be assigned a priority, with windows of higher priority overlying windows of lower priority where they overlap. One known way of dealing with the overlapping windows is to start from the window of lowest priority, draw this and then proceed to draw the window with the next highest priority until all the windows have been drawn. By proceeding in such a way those portions of the lower priority windows that are overlapped by higher priority windows are first drawn and then overlaid.

Such a technique is disadvantageously slow and distracting for the user. Time is spent needlessly drawing portions of low priority windows that will subsequently be overlaid by the higher priority windows. Updates to an overlapped window require all the overlapping windows to be redrawn. In addition, such a screen cannot be readily printed or plotted on a printer or plotter since it is not possible to wipe out overlapped parts as you can on a screen.

An alternative way of dealing with overlapping windows would be to provide a clipper which assigns ownership of picture elements of a display to a particular window and only allows the window owning a given picture element to write to it. Such a technique requires a disadvantageous processing and data storage overhead resulting from the need to deal with each picture element separately. The relative inefficiency of this technique is particularly apparent when graphics orders (i.e. instructions defining graphics objects such as lines, areas, circles etc.) are being processed.

It will be seen that there exists a need for way of dealing with overlapping windows (areas of overlapping graphics—not necessarily rectangular or variable in size) which does not rely on first drawing and then overlaying the lower priority windows and yet does not introduce the disadvantages associated with the alternative.

SUMMARY OF THE INVENTION

Viewed from a first aspect the invention provides a method of displaying overlapping windows containing graphics objects defined by graphics orders comprising the steps of processing said graphics orders to generate modified graphics orders defining those portions of said graphics objects not overlapped, and driving a graphics display device with said modified graphics orders to display said portions of said graphics objects not overlapped.

The invention provides a technique by which the portion of a window which is not overlaid, and therefore is to be displayed, may be determined so avoiding needlessly displaying and then overlying of hidden portions. In addition this function is achieved without having to use a clipper based on individual picture element ownership with its accompanying disadvantages.

The system will often already contain clipping mechanisms for determining what portion of a body of material lies within the boundary of the window within which that body of material is to be displayed. The invention adapts these existing clipping mechanisms to process graphics orders to determine that portion lying outside of windows of higher priority. Accordingly, existing fast and proven clipping mechanisms, which are normally used to determine what lies within a boundary, may be adapted to determine what lies outside a given set of boundaries.

In preferred embodiments of the invention a list of windows capable of overlying said graphics objects is read, and said step of processing said graphics orders to generate modified graphics orders is performed for each overlying window read from said list. This preferred way of dealing with the windows is both simple and efficient. It is also preferred that a priority value is associated with each window to indicate which windows are capable of overlying which other windows.

If said graphics includes a line, then preferably said step of processing said graphics orders to generate modified graphics orders includes detecting points at which said line crosses the border of a window and generating two, one or no lines representing the portions of said line not overlapped. The mechanism necessary to perform the detection of the crossing points is already built in to many windowing systems for use in clipping to the inside of windows.

If said graphics includes an area defined by boundary lines, then preferably said step of processing said graphics orders to generate modified graphics orders includes detecting those portions of boundary lines defining an area not overlapped and generating graphics orders defining closure lines along said overlying window border between points at which said boundary lines enter an overlying window and points at which said boundary lines exits said overlying window. The mechanism for determining in which direction to draw the closure lines can be adapted from the mechanism described in the copending application referred to earlier by joining entry points to exit points for clipping to the outside of a window rather than exit points to entry point for clipping to the inside of a window.

If said graphics includes image graphics comprising an array of picture element values, then preferably said step of processing said graphics orders to generate modified graphics orders includes turning off those picture elements overlaid. This procedure will work when the display device is operating in a mode in which pels which are turned off don't have any effect on material over which they are drawn, i.e. a background mix mode of leave alone.

In other modes it may be desired that the image be drawn with a specified background color. In such cases, when said image graphics is being displayed with a specified background, said step of processing said graphics orders to generate modified graphics orders includes generating graphics orders defining a background area, and clipping and displaying said background area as a graphics object prior to processing and displaying said image graphics. In this way the system can deal with background coloring using the existing mechanisms for other graphics objects. In particular, the background area can be treated as an graphics area to be displayed using efficient area fill methods.

Finally, if said graphics includes symbol set characters, then preferably said step of processing said graphics orders to generate modified graphics orders includes detecting and rejecting characters that are completely overlaid, detecting and drawing characters that are completely uncovered, and detecting characters that are partially overlaid, expanding such partially overlaid characters into lines or areas defined by boundary lines or image graphics and processing said expanded characters as if they were graphics objects defined by boundary lines or image graphics or lines. In this way text characters may be dealt with by using the mechanisms that already exist for processing other types of graphics, thereby increasing efficiency.

Viewed from a second aspect the invention provides a graphics display apparatus for displaying overlapping windows containing graphics objects defined by graphics orders comprising clipping logic having means for processing said graphics orders to generate modified graphics orders defining those portions of said graphics objects not overlapped, and means for driving a graphics display device with said modified graphics orders to display said portions of said graphics objects not overlapped.

BRIEF DESCRIPTION OF THE DRAWINGS

An embodiment of the invention will now be described, by way of example only, with reference to the accompanying drawings in which.

DESCRIPTION OF THE PREFERRED EMBODIMENT

Figure 1:
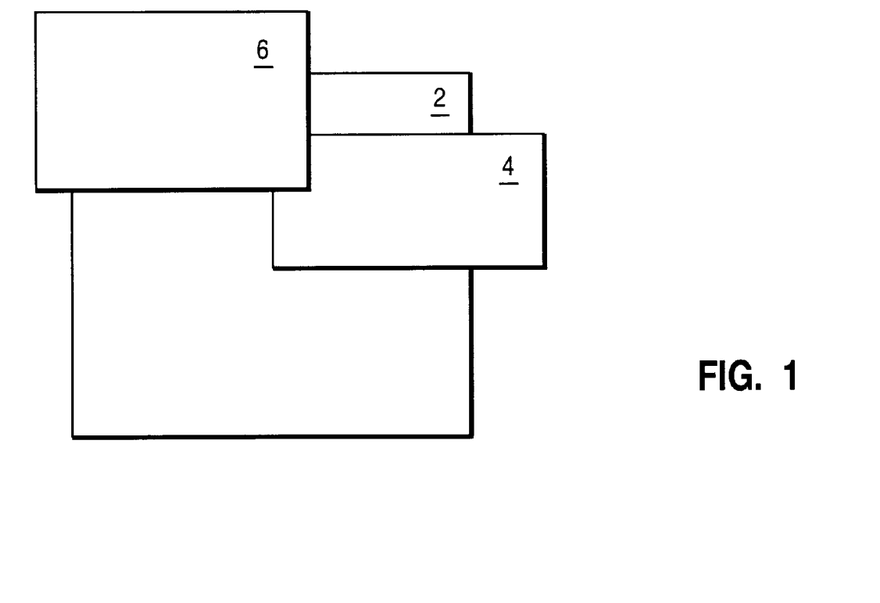
FIG. 1 illustrates an overlapping windows display of the type with which the invention may be used.

FIG. 1 illustrates a windowing display of the type with which the present invention is concerned. Window 2 is overlapped by windows 4 and 6. Window 2 has the lowest priority. Window 4 overlaps window 2 and is itself overlapped by window 6. Window 4 has a priority higher than window 2 and lower than window 6. Window 6 overlaps both window 2 and window 4. Window 6 has the highest priority. Window 6 displays material which obscures material within both window 2 and window 4.

Figure 2A:
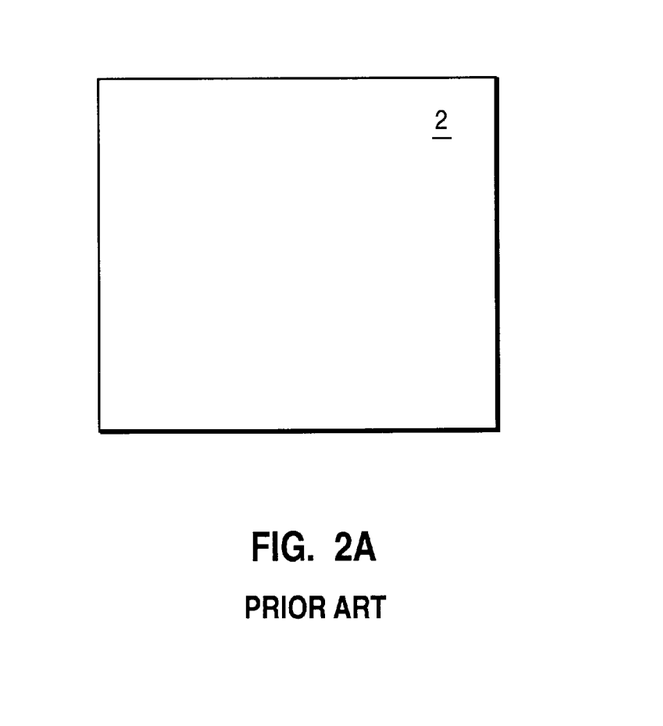
FIGS. 2a, 2b, and 2c illustrate a prior art technique for producing an overlapping windows display.
Figure 2B:
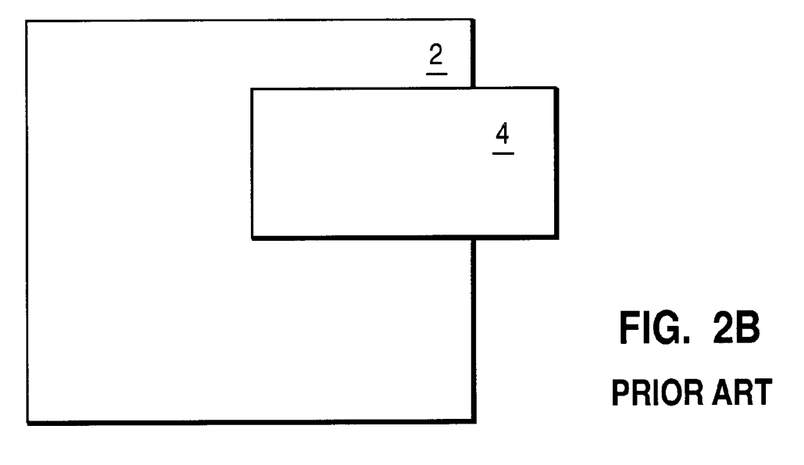
Figure 2C:
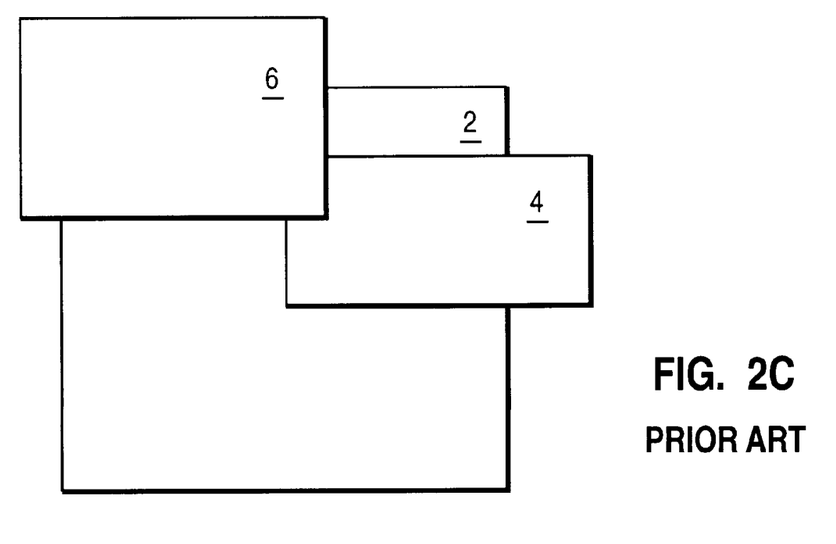

FIG. 2 illustrates one technique for producing a windows display as illustrated in FIG. 1. FIG. 2a illustrates the first step in this process in which the window with the lowest priority, namely window 2, is drawn. FIG. 2b illustrates the next step in this process in which the window with the next highest priority, namely window 4, is drawn. Window 4 overlaps window 2, and where this overlap occurs the material in FIG. 4 is drawn over the material in window 2 thereby rendering the previously displayed material no longer visible. FIG. 2c illustrates the final step in the process in which the window with the highest priority, namely window 6, is drawn. Window 6 overlaps both window 2 and window 4. The material in window 6 is drawn on top of the underlying windows and renders the overlapped material no longer visible.

Each window is in turn drawn in full starting from the lowest priority window and working to the highest priority window. Material in the lower priority windows is drawn and then obscured by overlying windows. This is both distracting to the user and inefficient. Time is spent needlessly drawing material which will subsequently be overlapped and obscured.

Figure 3:
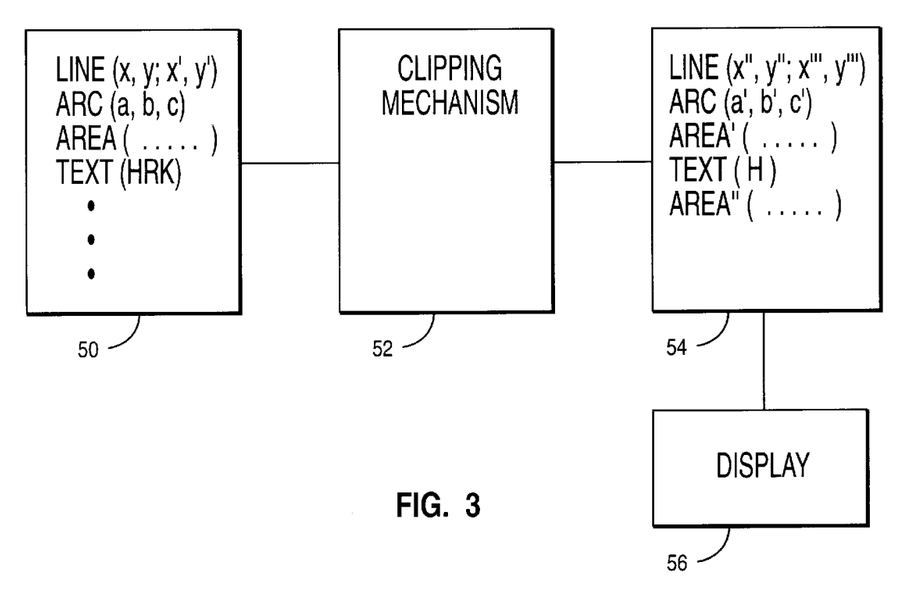
FIG. 3 illustrates the operation of the invention in general terms.

FIG. 3 illustrates the operation of the invention in general terms. The list of graphics orders 50 defining the unclipped graphics objects in a window are processed using a clipping mechanism 52. The clipping mechanism 52 adapts the existing mechanisms for clipping to the inside of a window to clip to the outside of overlying windows. A list of modified graphics orders 54 is generated by the clipping mechanism 52. The clipping mechanism refers to a list of windows with associated priority values to determine with respect to which potential overlapping windows a particular set of graphics orders should be clipped against. The list of modified graphics orders 54 represents those portions of the graphics objects which should be visible on the final screen. The list of modified graphics orders 54 is then used to drive the display 56. The manner in which the clipping mechanism 52 deals with several different types of graphics orders will be described below.

FIG. 4 illustrates the operation of the invention when the graphics includes lines. FIG. 4a shows two windows, namely window 12 and window 14. Window 12 has a higher priority than window 14 and accordingly material within window 14 may be overlaid and obscured by material within window 12 (this relationship between windows 12 and 14 is also used in describing the operation of the invention with other types of graphics objects). Lines 16, 18, 20 and 22 are graphics to be displayed within window 14. Each of these lines has a different relationship with respect to window 12. Line 16 lies completely outside of window 12. Line 22 lies completely within window 12. Line 20 has one end within window 12 and one end outside of window 12. Line 18 has its middle portion within window 12.

Figure 4A:
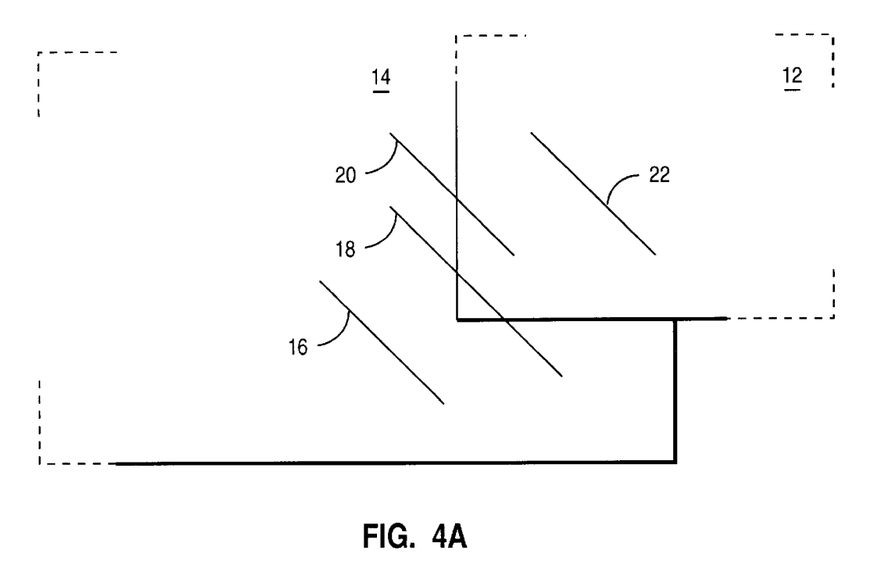
FIGS. 4a, 4b, 4c, and 4d illustrate the operation of the invention with graphics comprising lines.
Figure 4B:
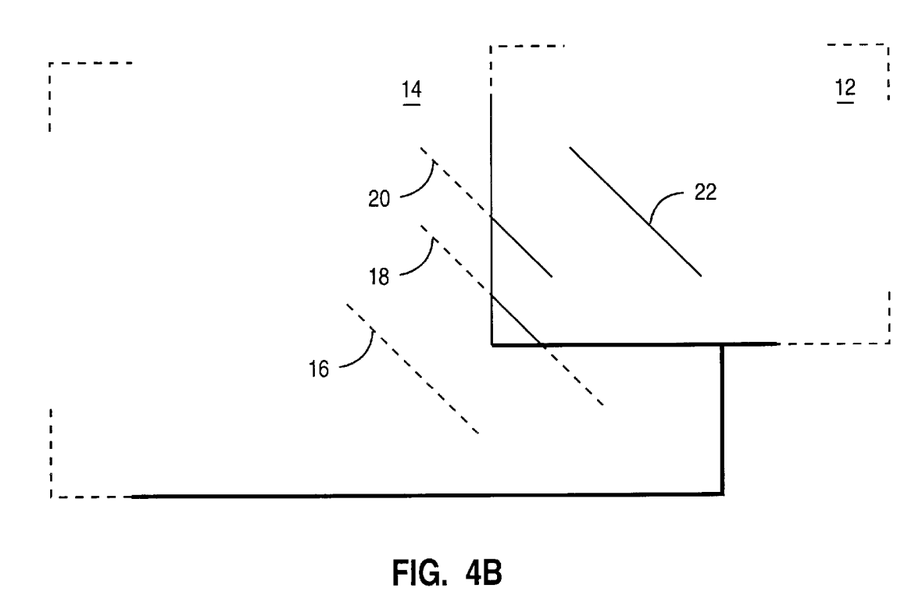
Figure 4C:
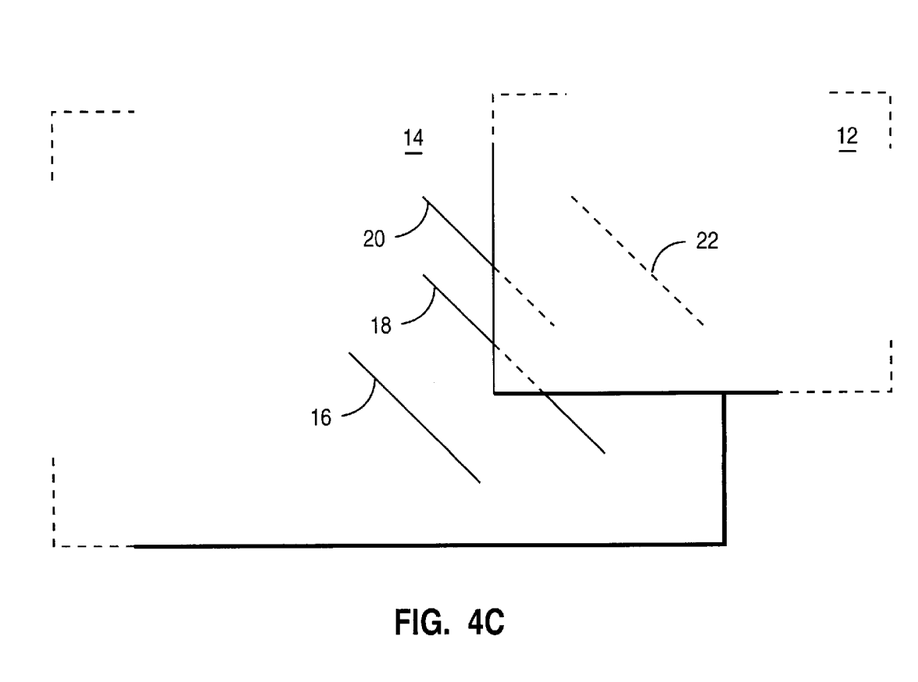
Figure 4D:
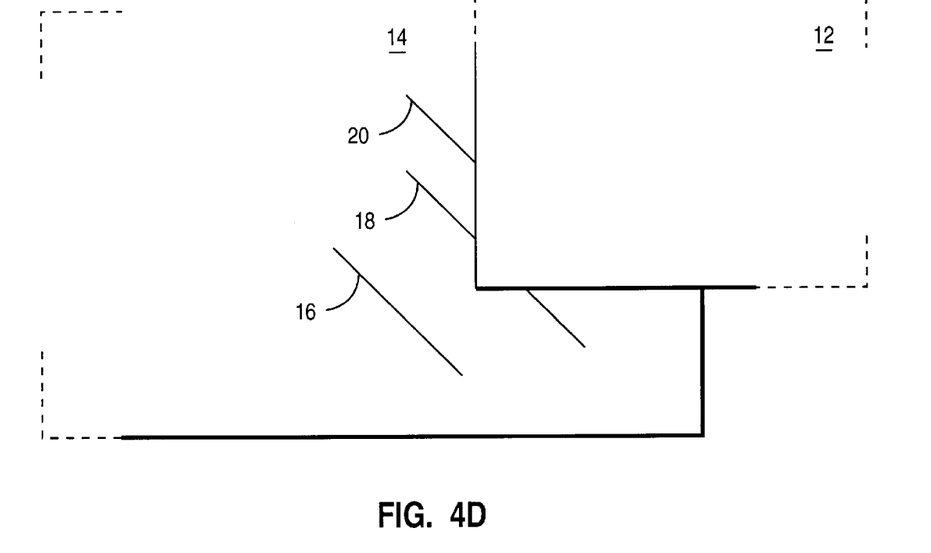

The first stage in the process is to determine which portions of the various lines lie within window 12. This is illustrated in FIG. 4b. A clipping technique such as those described in the book "Fundamentals of Interactive Computer Graphics" by J. D. Foley and A. Van Dam published by Addison-Wesley Publishing Company may be used to determine that line 22 lies entirely within window 12, one end of line 20 lies within window 12, and the mid portion of line 18 lies within window 12. The clipping technique detects the points at which the lines cross the window border. Lines that lie either entirely inside or entirely outside the window will not have crossing points. Line 16 is determined to lie entirely outside of window 12. The next stage in the process is illustrated in FIG. 4c. Each of the full lines is compared with the portion of that line determined to lie within window 12 and the difference is that portion lying outside window 12. The solid lines in FIG. 4c illustrate the portions determined to be outside window 12. FIG. 4d illustrates the final step in which graphics orders representing these portions are produced.

Figure 5A:
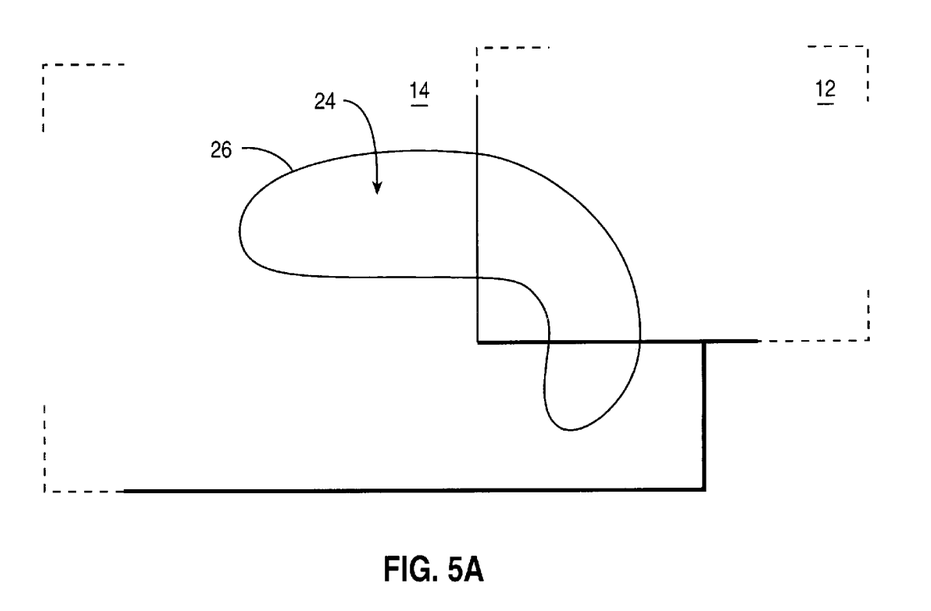
FIGS. 5a, 5b, and 5c illustrate the operation of the invention with graphics comprising areas defined by boundary lines.
Figure 5B:
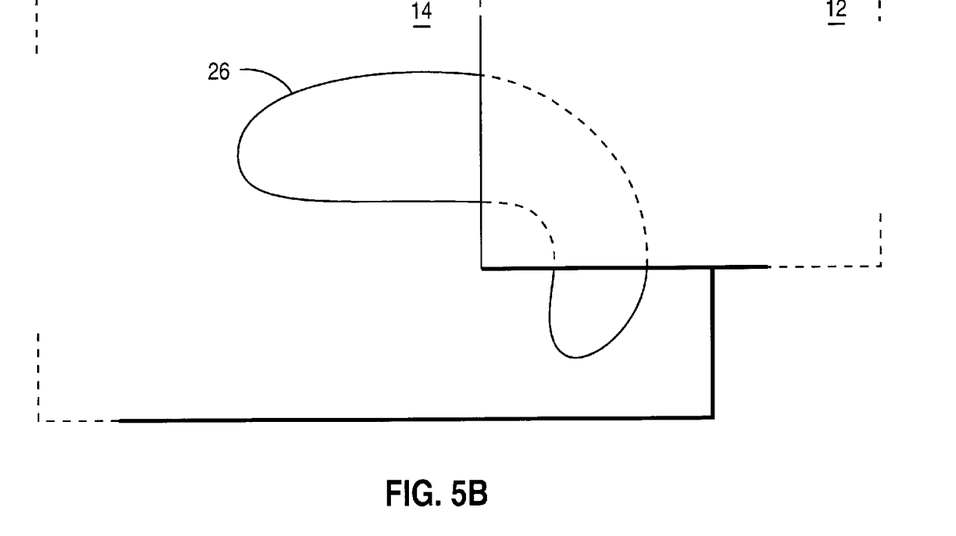

FIG. 5 illustrates the operation of the invention when the graphics is an area defined by its border. FIG. 5a shows an area 24 with a border 26 in relation to the windows described in connection with FIG. 5. The clipping process described above is applied to the border 26 to give the border lines shown in FIG. 5b corresponding to the portion of the border lying outside the window.

Figure 5C:
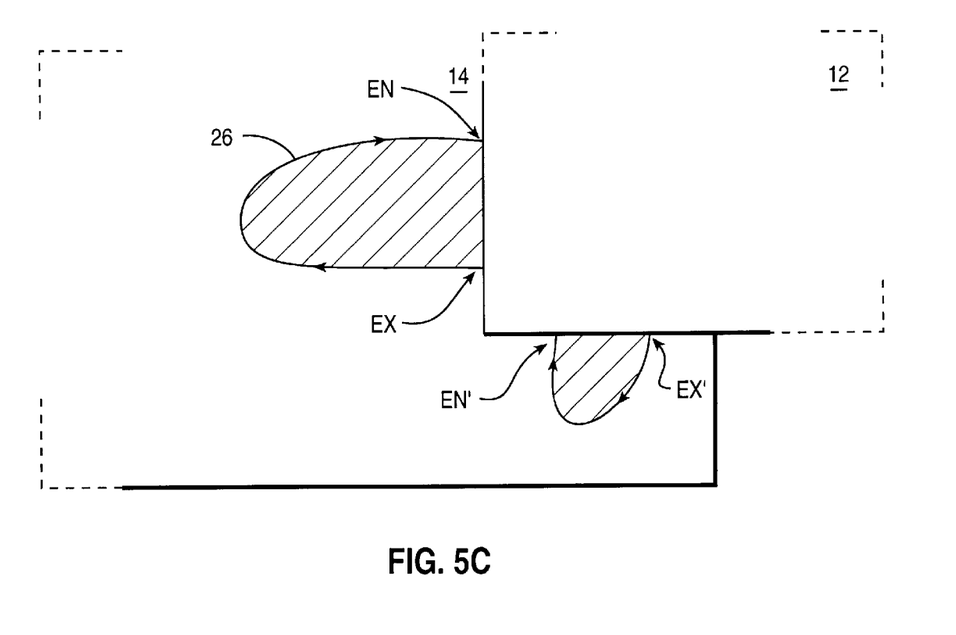

Closure lines must be drawn between the points at which the border 26 enters and leaves the window 12 to enable the filling algorithms to operate properly. The drawing of such closure lines is discussed in more detail in the copending application mentioned in the introduction, which application is incorporated herein by reference. As shown in FIG. 5c, the closure lines are drawn between entry points (EN) and exit points (EX). The closure lines are necessary to enable the area filling algorithms to operate correctly.

Figure 6A:
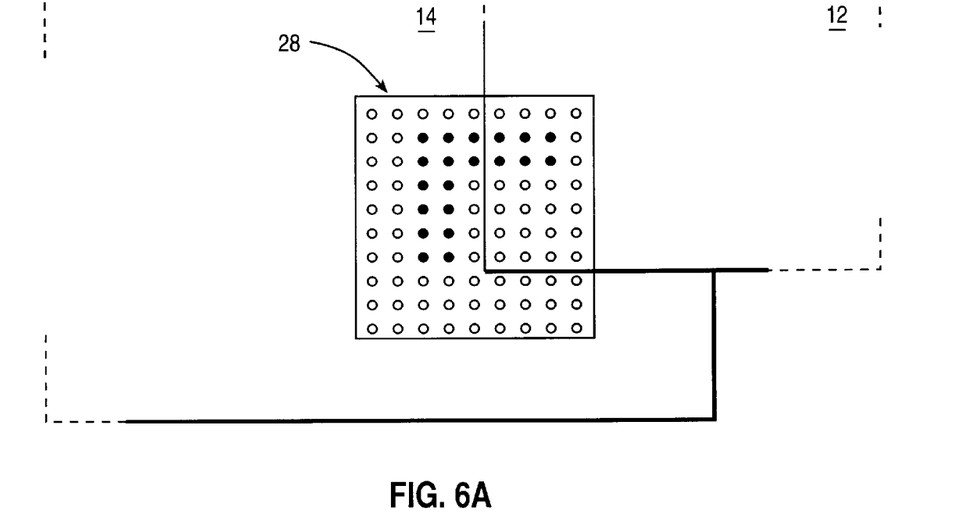
FIGS. 6a, and 6b illustrate the operation of the invention with graphics comprising image formed of an array of picture elements.
Figure 6B:
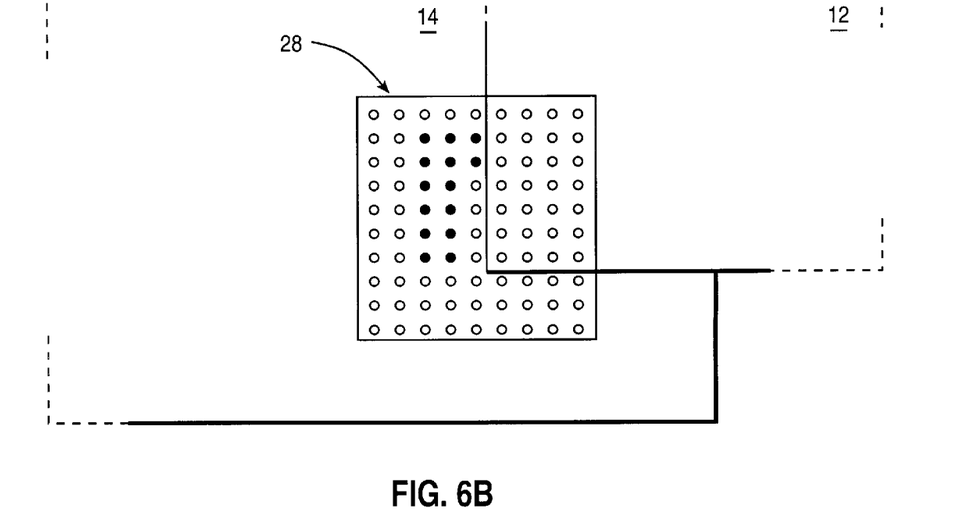

FIG. 6 illustrates the operation of the invention when the graphics is an image comprising an array of picture elements. FIG. 6a illustrates such an area of image graphics, in the approximate shape of an inverted L, lying partially within window 12 and partially within window 14. The clipping mechanism reads the x and y coordinates corresponding to the edges of window 12 and the area of image 28. Responsive to these the clipping mechanism then runs through the picture elements of the image 28 and turns off those lying within window 12. The result is illustrated in FIG. 6b. If no background is specified then when a picture element which is turned off is drawn it has no effect upon what was previously shown at that point.

If the image is being drawn with a specified background then the clipping mechanism operates by treating the background as a graphics object in its own right which must also be clipped before being drawn (i.e. if the image is overlaid in its center then both the background and the image must have the center clipped out of them). Once the clipped background is drawn then the image can be drawn on top as described above. The background can be treated in the same way as an area defined by its boundary and can be filled using an area filling algorithm. The clipping techniques previously described for areas are applied to the background area.

Figure 7A:
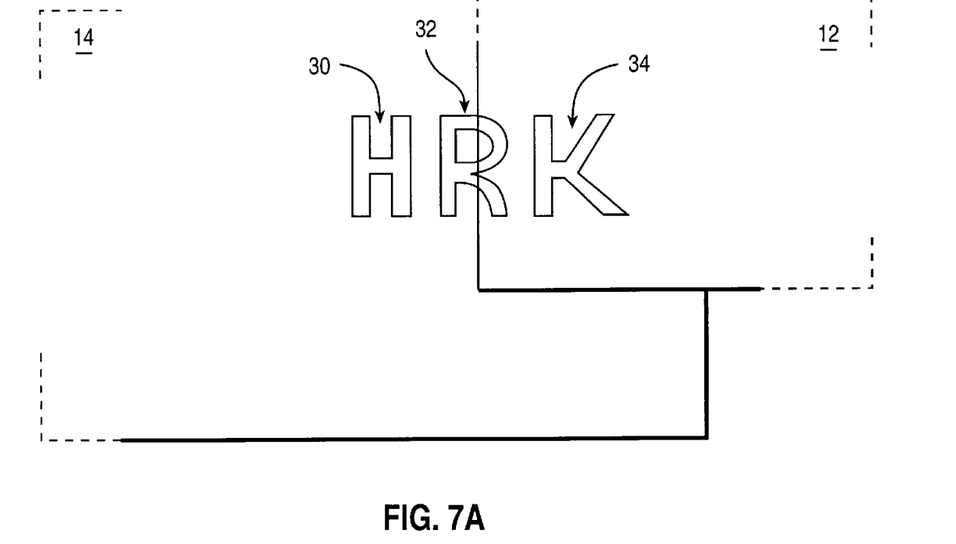
FIGS. 7a, 7b, and 7c illustrate the operation of the invention with graphics comprising text.
Figure 7B:
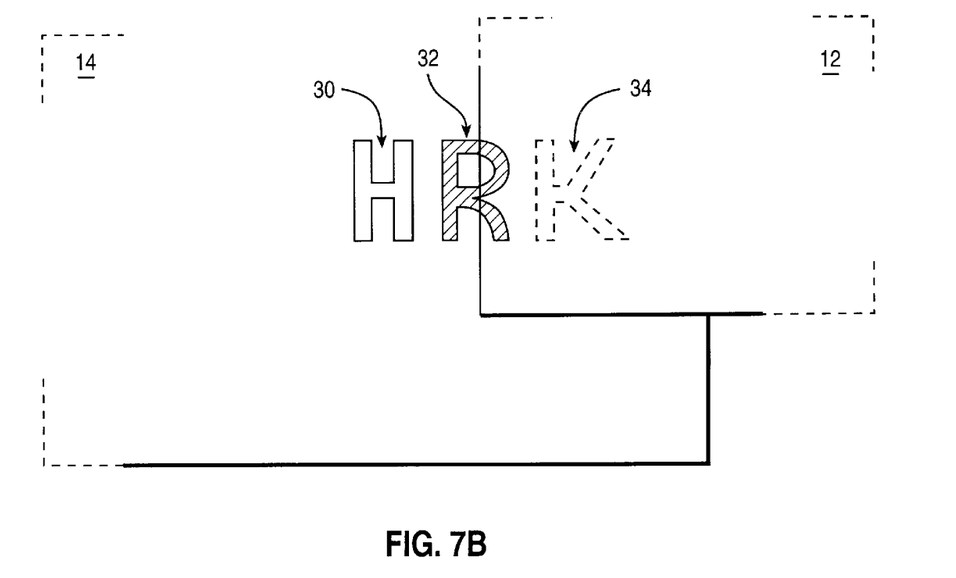
Figure 7C:
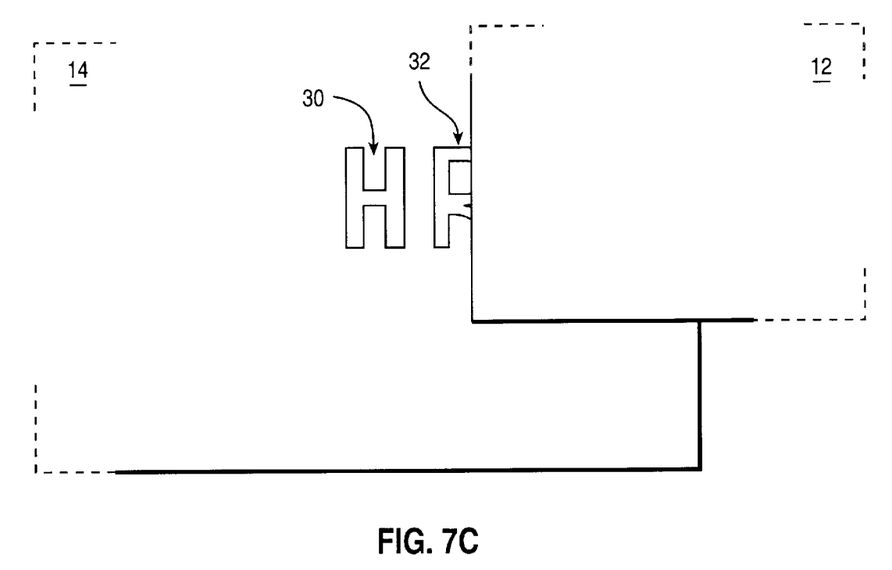

FIG. 7 illustrates the operation of the invention when the graphics comprises symbol set characters, e.g. text. Text characters are specified by a person creating graphics material by indicating a font and the characters required. The system then uses the specified characters to access the required graphics orders (image, area defined by border, or lines) to display that character, from the font. This saves effort as the form of the character does not have to be specified by the user. FIG. 7a illustrates three letters, 30, 32 and 34, each having a different relationship with respect to window 12. Letter 30 lies completely outside of window 12, letter 34 lies completely inside of window 12, and letter 32 overlaps the border between window 12 and window 14. FIG. 7b illustrates the first step in the process whereby letter 34 is identified as lying entirely within window 12, letter 30 is identified as lying entirely outside of window 12, and letter 32 is identified as lying partially inside window 12. Letters 30 and 34 may be relatively easily dealt with. Letter 30 will be displayed whereas letter 34 will not be displayed.

Depending upon the type of font being employed, it may be possible to expand (switch from treating as a character only, and instead treat as a piece of graphics in its own right, i.e. image, area defined by border, or lines) letter 32 as either image graphics or as an area/series of areas defined by its boundary or lines. Once the letter 32 has been expanded in this manner it will then be processed as either image graphics or an area defined by its boundaries or as lines in accordance with the techniques described in FIGS. 4, 5, or 6.

It will be appreciated by those skilled in the art that the technique of the present invention can be implemented as a computer program controlling a general purpose computer and graphical display system, or alternatively could be implemented as special purpose hardware (although in practice this latter would be difficult and expensive).

Figure 8:
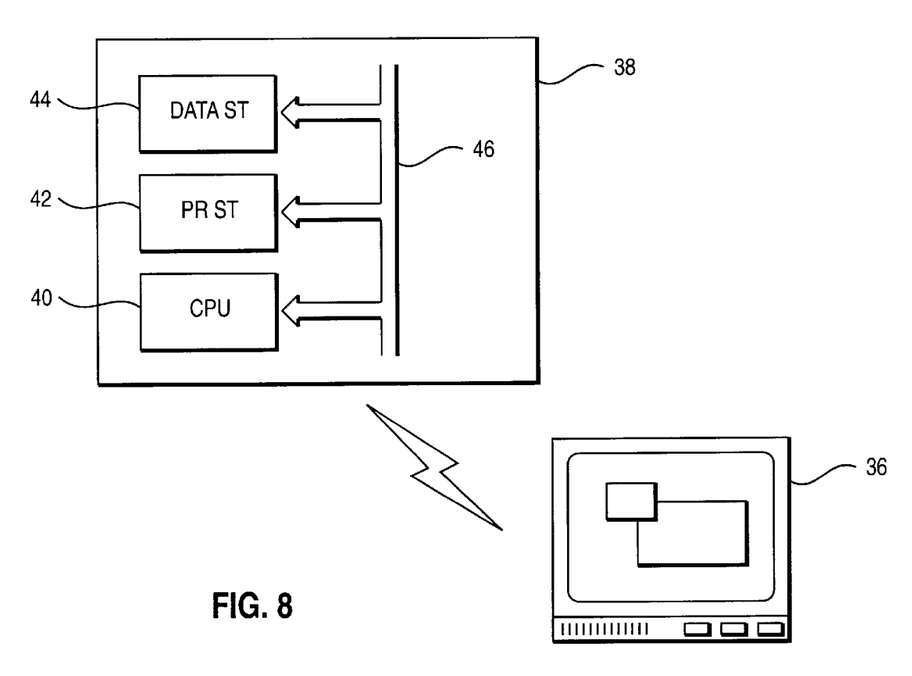
FIG. 8 illustrates a general purpose computer for implementing the invention.

FIG. 8 illustrates a general purpose computing system for implementing the present invention. A host computer 38 is connected via communication links to one or more display terminals 36. The host computer 38 includes a CPU 40, program storage 42 and data storage 44 all linked via a communication bus 46. The program store 42 will hold a graphics program such as the Graphical Data Display Manager program produced by International Business Machines Corporation. Under the control of such a program the CPU 40 performs the necessary logical functions required to carry out the invention. Under the control of a first set of computer program instructions the CPU performs as logic for detecting material within overlying windows, under the control of subsequent computer program instructions the CPU 40 behaves as logic for comparing the graphics detected with that which is not overlaid, and finally under the control of still further computer program instructions CPU 40 serves to drive the display terminal 36 to display the graphics determined to not be overlaid.

What is claimed is:

1. A method of displaying, on a display terminal, overlapping windows containing graphics objects defined by graphics orders comprising the steps of:

obtaining a first list of graphic orders for graphic objects in a first window of the overlapping windows and a second list of graphic orders for graphic objects in a second window of the overlapping windows, wherein the second window has a higher priority than the first window;

processing the first list to identify nonoverlapping graphic objects, wherein the nonoverlapping graphic objects are not within an overlapping portion of the first and second windows;

processing the second list of graphic orders and the nonoverlapping graphic objects to generate a list of modified graphic orders; and driving the display terminal, with the list of modified graphics orders to display the graphic objects of the second window and the nonoverlapping graphic objects of the first window.

2. A method of displaying overlapping windows as claimed in claim 1, wherein the step of obtaining the first and second lists is performed by reading a list of windows capable of overlying said graphic objects, and said step of processing said list of graphics orders to generate said list of modified graphics orders is performed for each overlying window read from said list of windows.

3. A method of displaying overlapping windows as claimed in claim 1, wherein if said graphics objects of the first window include a line, the said step of processing the first list includes:

detecting points at which said line crosses a border of the second window; and generating two, one or no lines representing at least a portion of the nonoverlapping graphic objects.

4. A method of displaying windows as claimed in claim 1, wherein if said graphic objects of the first window include an area defined by boundary lines, then said step of processing said first list includes:

detecting those portions of the boundary lines defining an area not overlapped by the second window; and generating a list of graphics orders defining closure lines along a border of the second window between points at which said boundary lines enter the second window and points at which said boundary lines exit the second window.

5. A method of displaying overlapping windows as claimed in claim 1, wherein if said graphics objects of the first window include image graphics comprising an array of picture element values, then said step of processing the first list includes turning off those picture elements overlaid by the second window.

6. A method of displaying overlapping windows as claimed in claim 5, wherein when said graphics objects of the first window are being displayed with a specified background, said step of processing the first list includes:

generating graphic orders defining a background area; and clipping and displaying said background area as a graphics object prior to processing and displaying said image graphics.

7. A method of displaying overlapping windows as claimed in claim 1, wherein if said graphics objects of the first window include symbol set characters, then said step of processing the first list includes:

detecting and rejecting characters that are completely overlaid by the second window;

detecting and drawing characters that are completely uncovered by the second window;

detecting characters that are partially overlaid by the second window;

expanding such partially overlaid characters into lines or areas defined by boundary lines or image graphics; and processing said expanded characters as if they were graphics objects defined by boundary lines or image graphics or lines.

8. A graphics display apparatus for displaying overlapping windows, wherein graphic objects in a first window of the overlapping windows are identified by a first list of graphic orders and graphic objects in a second window of the overlapping windows are identified by a second list of graphic orders, and wherein the second window has a higher priority than the first window the graphics display apparatus comprising:

clipping logic having;

detection means for detecting nonoverlapped graphics portions of the graphics objects of the first list, wherein the nonoverlapped graphics portions are not overlaid by the second window;

processing means, operably coupled to the detection means, for processing the nonoverlapped graphics portions and the second list of graphics orders to generate a list of modified graphics orders; and means for driving a graphics display device with said list of modified graphics orders to display said portions of said graphics objects not overlapped based on the modified graphics orders.

9. A graphics display apparatus as claimed in claim 8, wherein said clipping logic includes means for processing graphics orders in the first window comprising symbol set characters by detecting and rejecting characters that are completely overlaid by the second window, detecting and drawing characters that are completely uncovered by the second window, detecting characters that are partially overlaid by the second window, expanding such partially overlaid characters into lines or areas defined by boundary lines or image graphics, and processing said expanded characters as if they were graphics objects defined by boundary lines or image graphics or lines.

\* \* \* \* \*